US006795575B1

(12) United States Patent
Robinson et al.

(10) Patent No.: US 6,795,575 B1
(45) Date of Patent: Sep. 21, 2004

(54) LINE-SCAN IMAGING IN 3-D

(75) Inventors: Max Robinson, Nottingham (GB); Paul Evans, Nottingham (GB)

(73) Assignee: Nottingham Trent University, The, Nottingham (GB)

( * ) Notice: Subject to any disclaimer, the term of this patent is extended or adjusted under 35 U.S.C. 154(b) by 0 days.

(21) Appl. No.: 09/541,139

(22) Filed: Mar. 31, 2000

Related U.S. Application Data

(63) Continuation of application No. PCT/GB98/02923, filed on Sep. 29, 1998.

(30) Foreign Application Priority Data

Oct. 1, 1997 (GB) ............................................. 9720864

(51) Int. Cl.[7] ............................. G06K 9/00; G01C 3/14; H04N 13/00; H04N 15/00
(52) U.S. Cl. ............................ 382/154; 356/12; 348/42; 348/49; 348/50
(58) Field of Search ................................ 382/154, 141; 345/419–427; 356/12; 348/42, 49, 50

(56) References Cited

U.S. PATENT DOCUMENTS

| | | | | |
|---|---|---|---|---|
| 3,527,880 | A | * 9/1970 | Jordon | 348/50 |
| 4,214,267 | A | 7/1980 | Roese et al. | 358/111 |
| 4,286,286 | A | 8/1981 | Jurisson et al. | 358/92 |
| 4,366,382 | A | 12/1982 | Kotowski | 378/57 |
| 4,807,024 | A | * 2/1989 | McLaurin et al. | 348/50 |
| 5,325,193 | A | * 6/1994 | Pritchard et al. | 348/50 |
| 5,583,345 | A | * 12/1996 | Kohgami et al. | 250/580 |
| 5,717,415 | A | * 2/1998 | Iue et al. | 345/8 |
| 5,953,054 | A | * 9/1999 | Mercier | 348/50 |
| 5,987,159 | A | * 11/1999 | Nichani | 382/141 |
| 5,987,163 | A | * 11/1999 | Matsuda | 382/154 |
| 5,991,437 | A | * 11/1999 | Migdal et al. | 382/154 |
| 6,009,189 | A | * 12/1999 | Schaack | 382/154 |
| 6,125,198 | A | * 9/2000 | Onda | 382/154 |
| 6,393,141 | B1 | * 5/2002 | Cronshaw et al. | 382/141 |

FOREIGN PATENT DOCUMENTS

| | | |
|---|---|---|
| EP | 0 261 984 A | 3/1988 |
| GB | 2 168 565 | 6/1986 |
| GB | 2 167 266 | 5/1988 |
| JP | 58 055 843 | 6/1983 |
| WO | WO 99/17555 | 9/1998 |

OTHER PUBLICATIONS

Godber, S. et al., "Line–Scan Sensor: An Alternative Sensor Modality for the Extraction of Three–Dimensional Coordinate Information" *Optical Engineering*, vol. 34, No. 1, Oct. 10, 1995, pp. 3044–3053.

Zhang Sen et al., "Recent Progress in X–Ray Sterioscopes", *Medical Physics*, vol. 10, No. 5, Sep.–Oct. 1983, pp. 574–578.

* cited by examiner

*Primary Examiner*—Daniel Mariam
*Assistant Examiner*—Shefali Patel
(74) *Attorney, Agent, or Firm*—Fredrikson & Byron, P.A.

(57) ABSTRACT

Apparatus and a method for producing a stereoscopic line-scan image of an object in which a detector camera is used to view the object, means are provided to move relative to one another the surface of the object past the detector in a direction which is at right angles to the scanning lines direction of the detector, and means are provided to select the outputs from two spaced lines in each picture frame produced by the detector and store those lines in a frame store to build up individual pictures from each of the two lines, so that one individual picture constitutes a left hand picture of a stereoscopic pair and the other individual picture constitutes a right hand image of a stereoscopic pair. Preferably the detector camera is a television camera or a full field digital.

15 Claims, 6 Drawing Sheets

LINE-SCAN IMAGING IN 3-D

This application claims priority to, and incorporates by reference the teachings of, copending International Application Number PCT/GB98/02923, filed on 29 Sep. 1998, having the International Publication Number of WO 99/17555, published 8 Apr. 1999, which in turn claims priority from United Kingdom Serial Number 9720864.9, filed 1 Oct. 1997.

This invention relates to line-scan imaging in 3-D, and in particular to the use of an imaging detector such as a single CCTV camera.

Line-scan cameras have been in existence for many years. They consist of a single line of photo sites, usually made of silicon, in front of which is a standard lens controlling focus, aperture etc. This is effectively a one dimensional sensor which can form the image of a scene if relative lateral movement takes place between the object of interest and the sensor. The line-by-line sequence of imaging information is built up into an area image by using a frame store. Typical applications are in checking components being moved by conveyor in a manufacturing environment. These components are usually flat, such as printed circuit boards, where 2-D pattern matching algorithms are used for inspection purposes.

A 3-D (stereoscopic) line-scan system could be built using two line-scan cameras configured to provide left and right perspective information. With such a system it would be possible to extract 3-D coordinate data from the image of an object and thus make 3-D inspection possible. For such a system to work there would need to be precise geometrical alignment of both line-scan cameras and also well matched lenses would be essential. These requirements could cause severe problems in setting up such a system since an image could only be formed after movement has taken place and so real-time adjustments of such simple things as focus are not possible. Since precise matching between the parameters of both cameras is essential if acceptable 3-D images are to be produced, then the set-up procedure can be both time consuming and imprecise.

It is, therefore, an object of the invention in one aspect to avoid these problems.

Therefore, according to the invention apparatus is provided for producing a stereoscopic line-scan image of an object in which a detector camera, such as a television camera, is used to view the object, the detector camera having an output signal generated by scanning the received image in a series of parallel lines across the detector, means are provided to move relative to one another the surface of the object past the area viewed by the detector in a direction which is at right angles to the parallel lines across of the detector, and means are provided to select the outputs from two spaced lines in each picture frame produced by scanning the detector and store those lines in a frame store to build up individual pictures from each of the two lines, so that one individual picture constitutes a left hand picture of a stereoscopic pair and the other individual picture constitutes a right hand image of a stereoscopic pair.

Also according to the invention there is provided a method of producing a stereoscopic pair of images, in which the surface of an object is moved past a detector camera which produces an output signal generated by scanning the received image in a series of parallel lines across the detector, the direction of movement of the object being at right angles to the scanning line direction of the detector, and the outputs from two spaced lines in each picture frame produced by the detector are stored and individual pictures are built up from each of the two lines, so that one individual picture constitutes a left hand picture of the stereoscopic pair and the other individual picture constitutes a right hand image of the stereoscopic pair.

By operating in this way all of the problems of the set up of two separate cameras or detectors are avoided. Thus one only selects the image information from two of the multiplicity of video lines available each frame. If the detector is a camera it can be used as a standard television camera to view the object during set up and its direction, focus, brightness and contrast can be selected to give a good, high quality, image. Then, one can switch to the arrangement according to the invention where the video information from single lines is selected and, as the surface of the object is moved past the television camera, successive signals from those individual lines are selected, stored and then put together to form the two separate pairs of stereoscopic images. All of this can be achieved by means of a suitable program and stored in a frame store and thereafter the image can be looked at and manipulated as required.

By way of example, the left and right hand images which result can be viewed as a stereoscopic pair and there are very well known systems available such as the red/green anaglyph, field sequential, and lenticular screen systems, which enable one to present or view left and right hand images. Therefore any of these systems can be used.

In a more sophisticated operation as will be described below, however, one can subtract the video signal in the left hand image from that in the right hand image, or vice versa. This will have the effect of providing an output signal which is unique. Therefore, one can readily use and store that signal in a data base and compare it with signals obtained from other objects to see if there is correspondence. For example such a technique can be extremely useful in forensic analysis in the comparison of cylindrical objects like spent cartridge cases or in the examination of the bullets after firing as will be described in more detail below.

In order to enhance or reduce the depth of the resulting stereoscopic image when viewed one can, of course, chose lines having varying positions in the overall video picture frame. By choosing lines which are spaced apart as far as possible across the video frame, i.e. a line from the very beginning of each complete scan and a line at the end of such a scan, one can create the greatest impression of depth. By choosing lines which are closer together a reduced impression of depth can be given. This can be achieved by programme means which processes the video signal so that an operator can chose a particular impression of depth which he find suits his purposes the best. The system of the invention is, therefore, very flexible and can present information to the unique requirements of any particular operator yet in a very simple fashion.

Where the detector camera is a television camera, it is being used according to this aspect of the invention, for two distinct functions and such a use is quite unique. Thus the video signal from the television camera can be used as a standard video signal and displayed in standard fashion on a monitor. Alternatively the signal can be processed according to the invention to select individual lines in a scan and the results used to build up a pair of stereoscopic images which can then be viewed or presented stereoscopically.

In another embodiment of the invention X-ray images can be obtained using a point source X-ray and as the imaging chip a full-field digital X-ray plate detector. Such detectors can give an output analogous to the raster scan output from a conventional television camera, the only difference between this arrangement and the use of visible light being that a shadow picture is provided by the X-ray source rather than a light image. The output, however, is a digital signal and individual lines of the signal can be selected to build up the individual picture.

The direction of scanning of the detector must be at right angles to the direction at which the surface of the object moves past it. In normal circumstances with a conventional television camera, this will tend to mean that the scanning lines need to be vertically oriented so that it can look at the surface of an object moving past it horizontally. Traditionally a television camera has horizontal scanning lines and so in one very simple embodiment according to the invention one simply turns the camera through 90° so that it's scanning lines are then substantially upright. Alternatively, however, it is possible to produce by program means upright or vertical lines from the video signal, in which case it would then not be necessary to reorient the camera.

In a particularly favourable embodiment according to the invention the object being examined is a cylindrical object. Under these circumstances the surface of the cylindrical object can be moved past the detector by mounting the object on a horizontally rotatable table and rotating the object about an upright axis with the detector such as a television camera looking at the object and preferably oriented at right angles to its normal orientation so that it's scanning lines are substantially upright.

The television camera can be in any form but a particularly preferred form is a solid state CCTV camera.

There are several advantages of such a system. One is that since a single lens or in the case of X-rays a single point source, and area array detectors are used, then real-time set-up of an image is very straight forward. Also, the geometric relationship between each line of pixels on the area array device is fixed in the silicon and so any pair of lines of pixels will automatically be oriented in a parallel geometry. By appropriate choice of respective lines, stereoscopic images can then be produced when using the area array in this line-scan mode.

Similar advantages are achieved by using an X-ray point source and a solid state digital imaging plate.

As noted above an important application exists where rotational motion would have significant advantages. The application would be for the inspection of essentially cylindrical objects. Viewing a cylindrical object with a conventional area array camera provides an image which is distorted at its edges due to the affect of linear perspective. This also causes a reduction in resolution at the extreme edges of the cylinder. All-round viewing of such objects is difficult and there are severe problems due to variable reflection across the surface.

Therefore, according to another aspect of the invention there is provided a method of reproducing a the surface of a cylindrical object into a two dimensional image, in which a cylindrical object is rotated about its axis in front of a detector camera, the axis and the orientation of the scanning lines of the detector camera being parallel with one another, and successive line-scans from the detector camera are stored and built up to produce the two dimensional image. Such an arrangement effectively unfurls the surface of a cylindrical object into an area image.

As will be appreciated a system according to the invention as described above using a television camera can be used in this method. To produce a simple two dimensional area image, only a single line from each of the scan images needs to be chosen and the video output from that line is stored in a suitable frame store to create the two dimensional image. Alternatively, and according to another embodiment of the invention, one can reproduce three dimensional information by producing a stereoscopic pair of images. Thus in this case one selects images from two spaced lines in each image scan and then one creates a stereoscopic pair of images as explained above. Thus, for example, the method of the invention can be used to inspect and control production of cylindrical objects.

There is a whole range of essentially cylindrical artifacts which could be inspected in this way. However, one particular problem exists which involves the matching of markings on the sides of spent cartridge cases for forensic ballistics applications. The system according to the invention would have a major advantage for such a situation. Thus a standard mechanism for producing a quality image of the cylindrical surface would then exist.

In particular the output from the detector camera is a line-scan signal which can readily be stored in a frame store and transferred to a data base in a standard manner. The data base can then be built up and searched automatically to match different specimens in much the same way as a fingerprint data base is operated.

A particular advantage of producing a stereoscopic pair of images in this way is that they can be processed to subtract the left image from the right image to provide a unique data signal. This as an alternative can be stored in a data base as noted above and that signal will only be achieved identically in the case where, for example, another spent cartridge casing is fired from the same rifle.

The invention would also have further application in the forensic science of examining the surface markings on fired bullets.

The invention will now be illustrated, by way of example, with reference to the accompanying diagrammatic drawings, in which.

Figure 1:
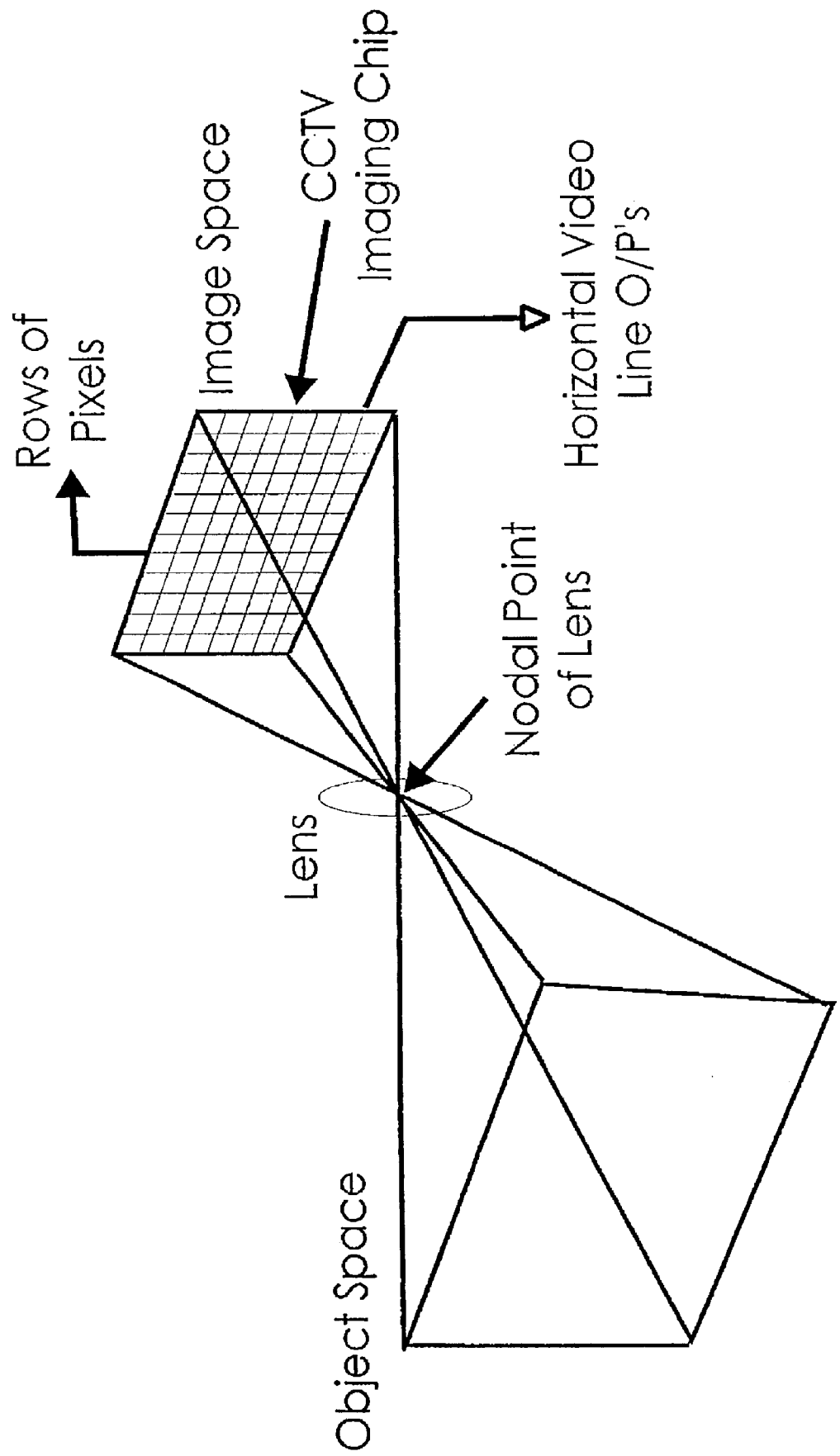
FIG. 1 is a schematic diagram showing the object space in relation to a solid state television type area array sensor.
Figure 2A:
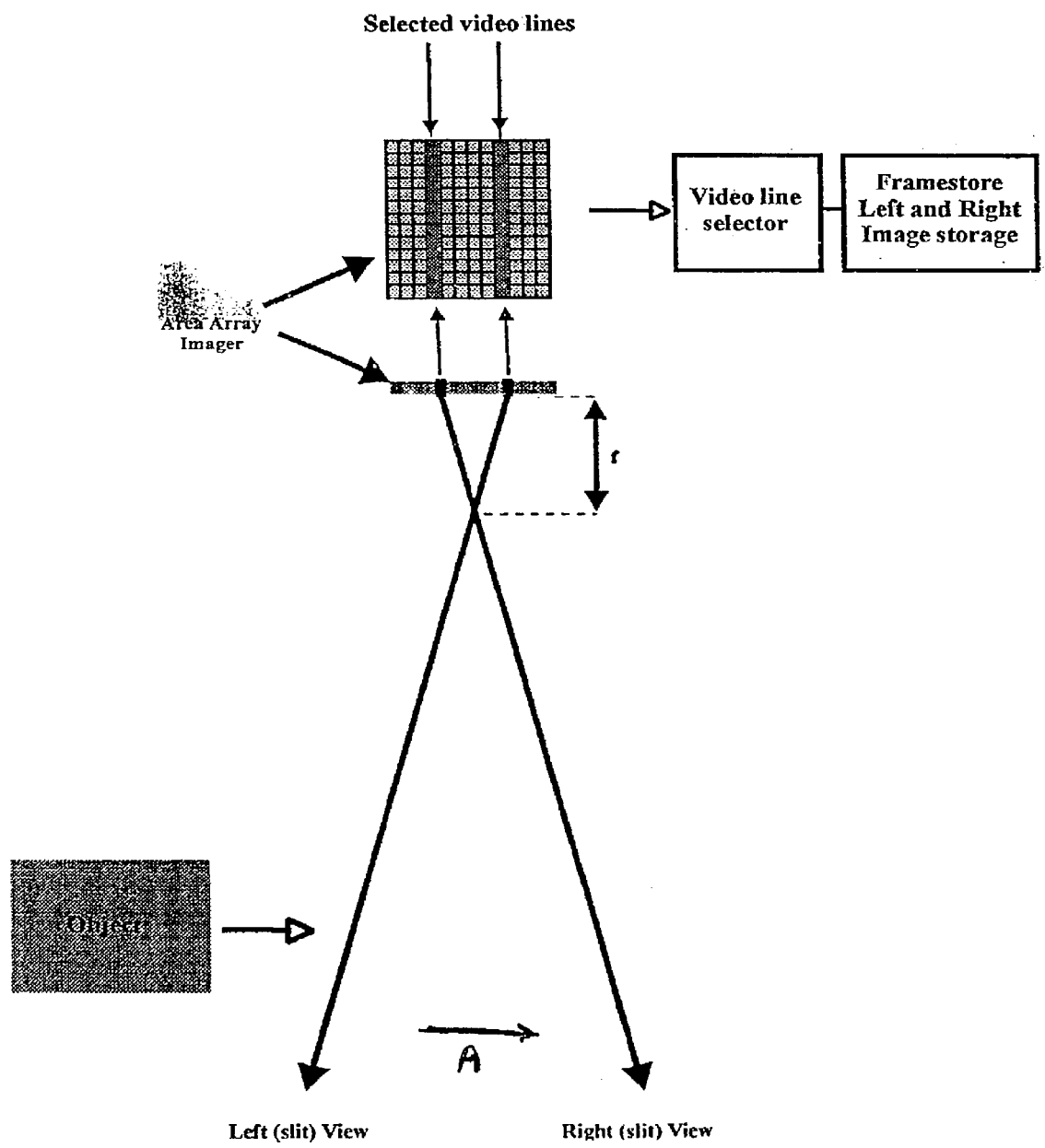
FIGS. 2a and 2b are plan diagrams illustrating the method according to the invention of preparing a stereoscopic pair of images.
Figure 2B:
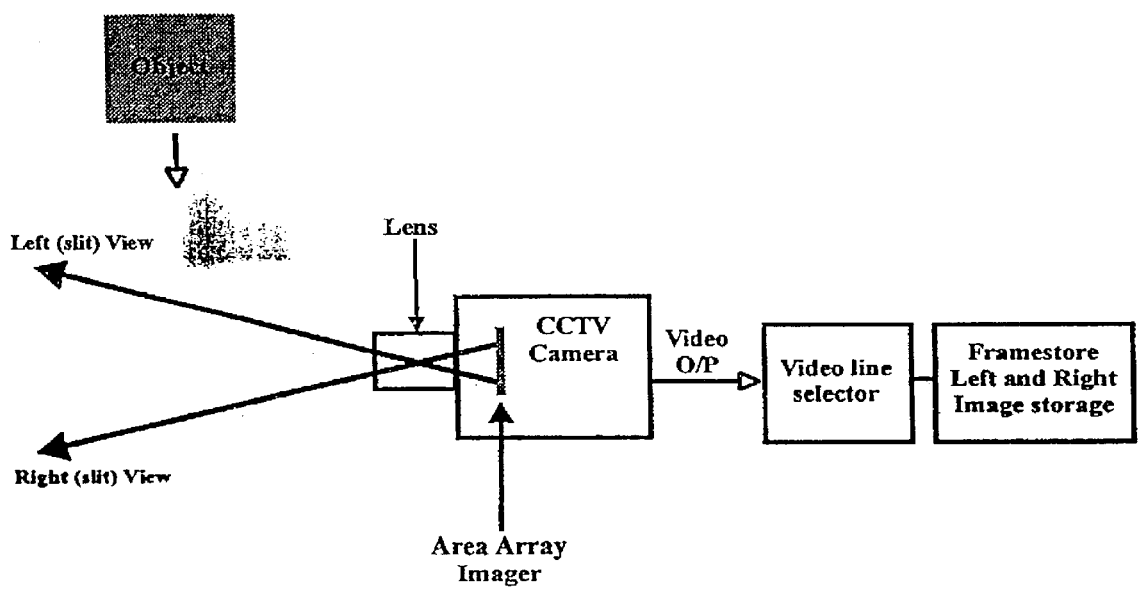

Referring to FIGS. 1 and 2, these are rays diagrams showing the paths of light from the four corners of an object impinging on a CCTV imaging chip after passing through a lens positioned a distance f from the chip. As best seen in FIGS. 2a and 2b, the outputs from selected video lines are chosen by a selector are passed to a framestore for left and right images, these being a stereoscopic pair.

The image of the object is first of all focused on the area array and aperture setting and lighting controls in real time are set as a conventional CCTV camera. After this the camera is switched using control electronics such that only the two selected lines of video are collected and stored in a line-scan mode.

By selecting just which pair of video lines to use the parameters of the stereoscopic image can be varied. In fact any number of lines can be selected and their information stored appropriately to provide a range of stereoscopic images. The object is of course required to move laterally, i.e. in the direction of the arrow A (FIG. 2A), with respect to the sensor lines.

Well known algorithms can be used to extract 3-D co-ordinate data from the various stereo pairs.

Figure 3:
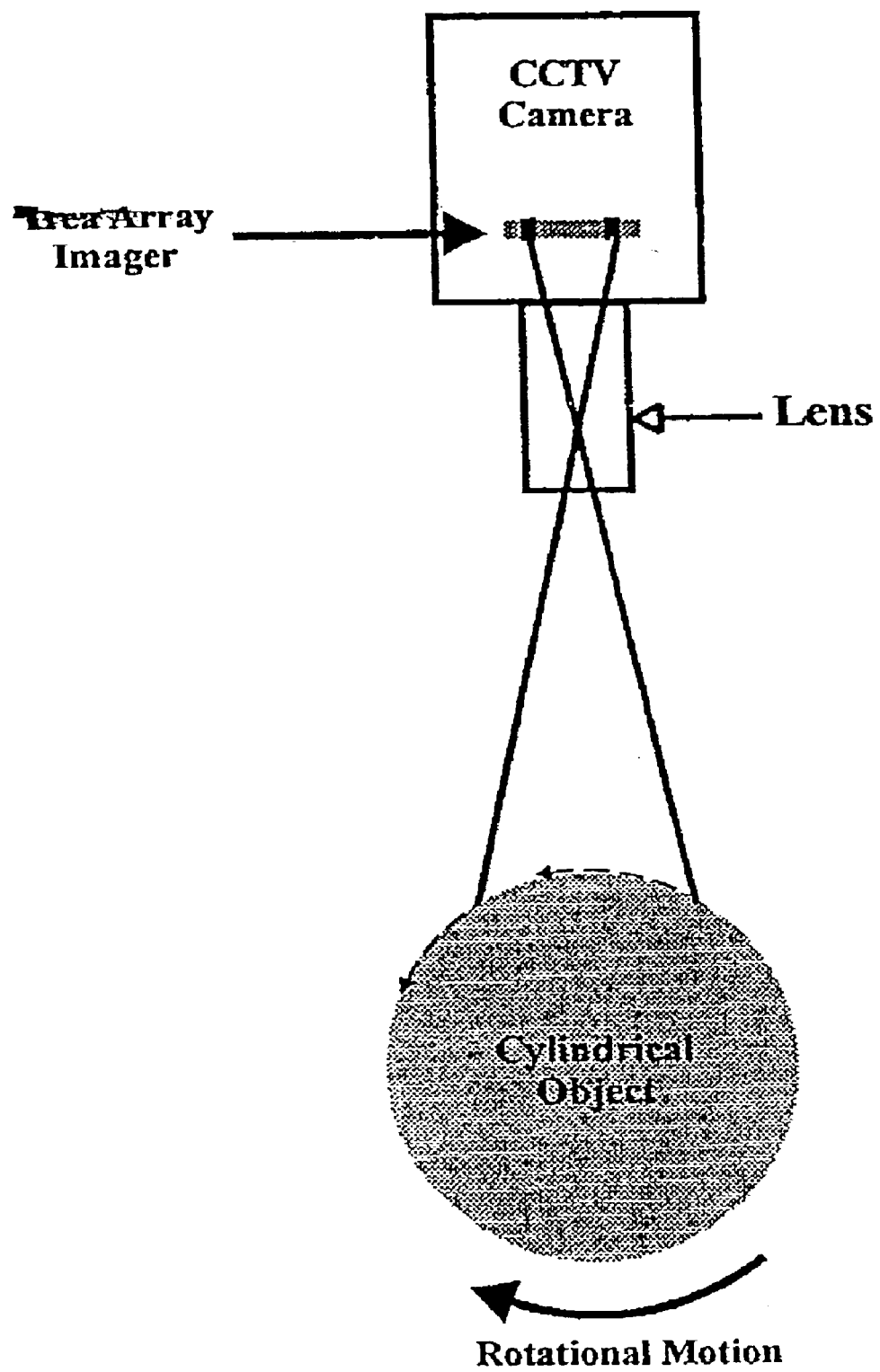
FIG. 3a is a plan diagram illustrating the examination of the surface of a cylindrical depth object by a method according to the invention.

FIG. 3 shows the technique applied to an essentially cylindrical object. Here the surface of the cylindrical object is rotated past the CCTV camera. 3-D co-ordinate data can be obtained from this surface as well as providing a stereoscopic image as explained previously.

Figure 4:
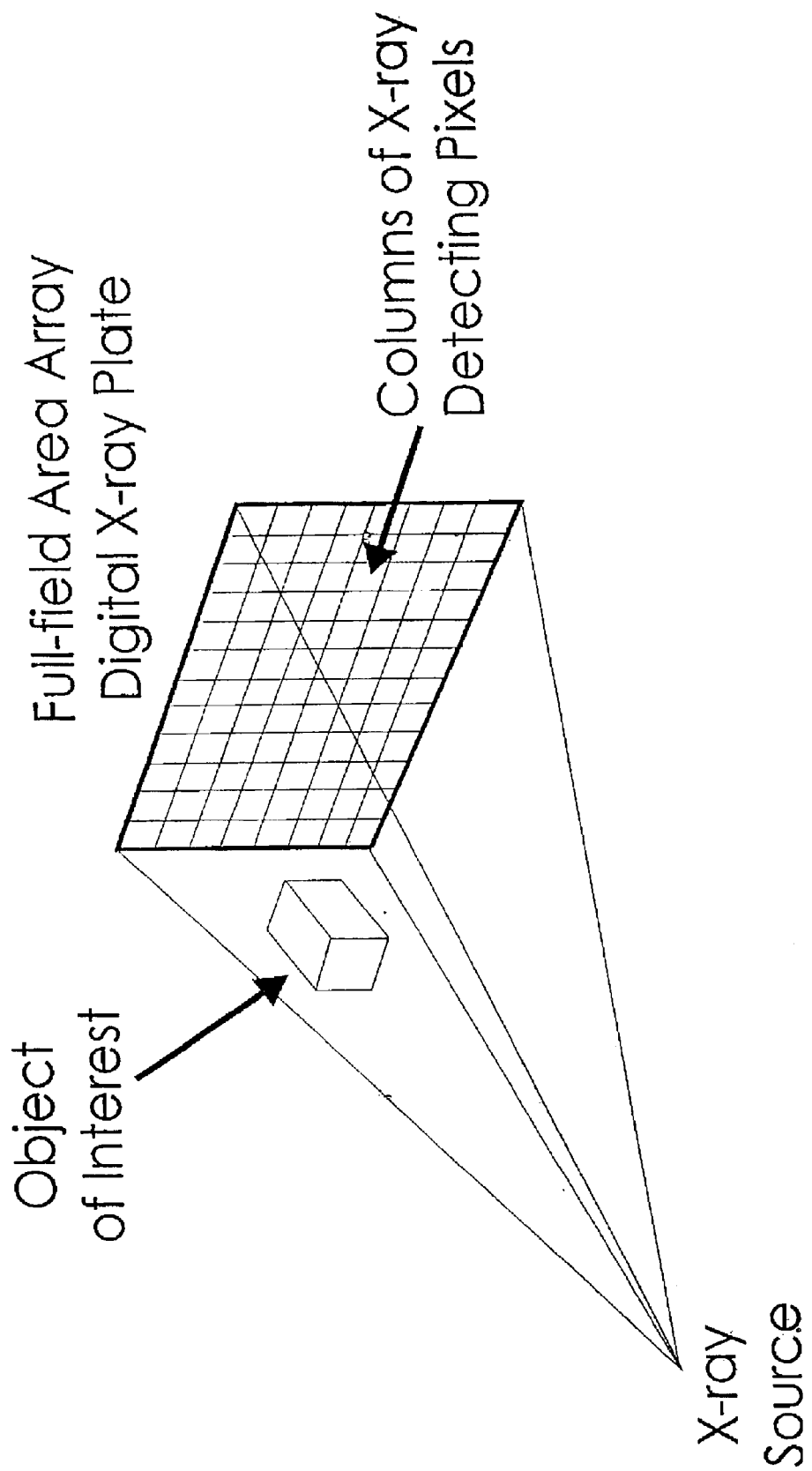
FIG. 4 is a diagram showing an object of interest in relation to an X-ray point source and full-field area array digital X-ray plate.

The invention can also be applied to X-ray imaging. If one considers FIG. 1, the nodal point of the lens can be seen to be analogous to an X-ray point source. The imaging chip is analogous a full-field digital X-ray plate. FIG. 4 shows the arrangement for X-ray imaging. The object of interest is placed between the X-ray source and the detector plate and a 2-D shadowgraph image is produced by reading out all the pixel information in a similar way to a solid state CCTV camera. According to the invention a pair of lines are selected and the object is translated through two collimated X-ray beams impinging on these lines. A stereoscopic X-ray image then results.

Alternatively the object can remain stationary and the X-ray source and full field array can be moved past the object.

Figure 5:
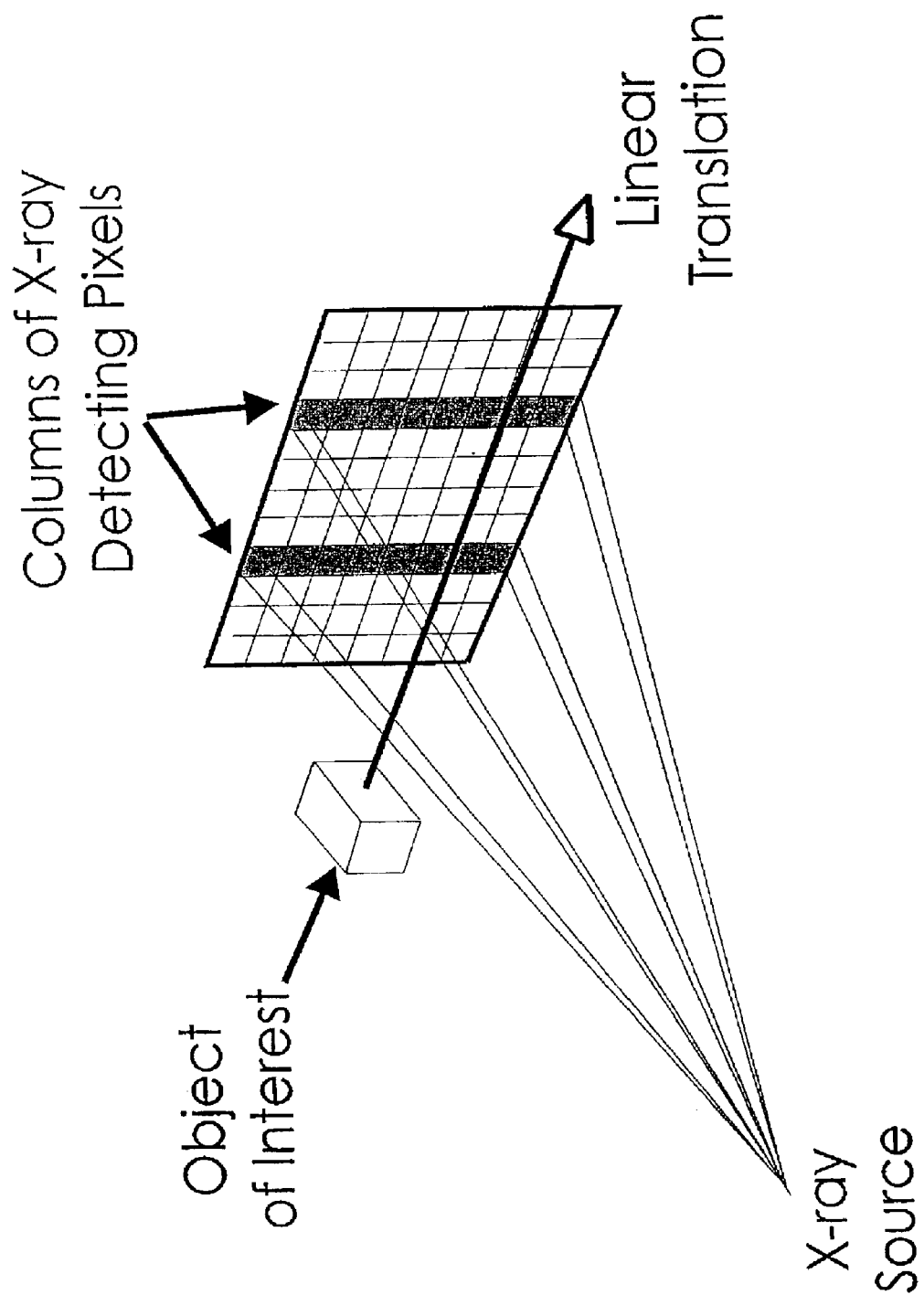
FIG. 5 is a diagram similar to FIG. 4 showing the moving of the object through the X-ray beam a method according to the invention.

In fact a multiplicity of lines could be defined in this way in order to create multiple stereoscopic images. FIG. 5 shows the arrangement using just 3-beams. These multiple stereoscopic images could be presented in sequence to an observer using any of the known stereoscopic viewing techniques. This would have a similar visual effect to viewing a hologram if head-tracking of the observer were included. This latter effect would also apply to the visible light images produced from the CCTV camera.

What is claimed is:

1. Apparatus for producing a stereoscopic line-scan image of an object in which a detector camera is used to view the object, the detector camera having means for scanning the received image in a series of parallel lines across the detector of the camera and providing a resulting output signal corresponding to that scanning, means are provided to move relative to one another the surface of the object past the detector camera in a direction which is at right angles to the parallel lines across the detector, and means are provided to select the parts of the resulting output signal from two spaced lines in each picture frame produced by scanning the detector and storing those lines in a frame store to build up two individual pictures from each of the two lines as the object moves relative the detectors, so that one individual picture constitutes a left hand image of a stereoscopic pair and the other individual picture constitutes a right hand image of a stereoscopic pair.

2. Apparatus as claimed in claim 1 in which the detector camera is a television camera.

3. Apparatus as claimed in claim 2 in which the television camera is a solid state camera.

4. Apparatus as claimed in claim 1 in which the detector camera is a full-field digital X-ray plate detector arranged to receive X-rays from an X-ray point source.

5. Apparatus as claimed in any preceding claim further comprising means for subtracting the signal representing the left image from the right image, or vice versa, to provide a unique data signal.

6. Apparatus as claimed in claim 1 in which the detector camera comprises an area array detector.

7. A method of producing a stereoscopic pair of images, in which the surface of an object is moved past a detector camera which produces an output signal generated by scanning the received image in a series of parallel lines across the detector, the direction of movement of the object being at right angles to the scanning line direction of the detector, and in which parts of the resulting output signal from two spaced lines in each picture frame produced by the detector are stored and two individual pictures are built up from each of the two lines as the object moves past the detector, so that one individual picture constitutes a left hand image of the stereoscopic pair and the other individual picture constitutes a right hand image of the stereoscopic pair.

8. A method as claimed in claim 7 in which the detector camera is a television camera.

9. A method as claimed in claim 6 or claim 7 in which the object being examined is an essentially cylindrical object, the surface of the cylindrical object is moved past the detector camera by mounting the object on a horizontally rotatable table, the object is rotated about an upright axis, with the detector camera oriented so that it's scanning lines are substantially upright, and successive line-scan images from the detector camera are stored and built up to produce the two dimensional image.

10. A method as claimed in claim 7 in which a X-ray point source illuminates the object and the detector camera is a full-field digital X-ray plate detector.

11. A method as claimed in claim 7 in which the detector camera comprises an area array detector.

12. A method of reproducing the surface of an essentially cylindrical object into a two dimensional image, in which the cylindrical object is rotated about its axis in front of a detector camera, the axis and the orientation of scanning lines of the detector camera being parallel with one another, and successive line-scans from the detector camera are stored and built up to produce the two dimensional image.

13. A modification of the method claimed in claim 12 for reproducing three dimensional information by producing a stereoscopic pair of images of the surface of the cylindrical object, in which images form two spaced lines in each image scan are selected and a stereoscopic pair of images created by storing the outputs from the said two spaced lines and building up individual pictures from the stored lines so that one individual picture constitutes a left hand picture of the stereoscopic pair and the other individual picture constitutes a right hand picture of the stereoscopic pair.

14. A method as claimed in claim 10 in which the detector camera comprises an area array detector.

15. A method of producing a stereoscopic pair of images, in which an object is moved past a detector camera comprising an area array detector, the detector camera producing an output signal generated by scanning the received image in a series of parallel lines across the area array detector, the direction of movement of the object being at right angles to the scanning line direction of the detector, and in which parts of the resulting output signal from two spaced lines in each picture frame produced by the detector are stored and two individual pictures are built up from each of the two lines as the object moves past the detector, so that one individual picture constitutes a left hand image of the stereoscopic pair and the other individual picture constitutes a right hand image of the stereoscopic pair.

* * * * *